United States Patent
Kranz

(10) Patent No.: US 9,780,548 B1
(45) Date of Patent: Oct. 3, 2017

(54) TANDEM TRUNNION CLAMP

(71) Applicant: AFL Telecommunications LLC, Duncan, SC (US)

(72) Inventor: Steven Edward Kranz, Moore, SC (US)

(73) Assignee: AFL Telecommunications LLC, Duncan, SC (US)

(*) Notice: Subject to any disclaimer, the term of this patent is extended or adjusted under 35 U.S.C. 154(b) by 0 days.

(21) Appl. No.: 15/235,747

(22) Filed: Aug. 12, 2016

(51) Int. Cl.
  *H02G 7/05* (2006.01)
  *F16L 3/10* (2006.01)
  *F16L 3/22* (2006.01)
  *G02B 6/44* (2006.01)

(52) U.S. Cl.
  CPC ............ *H02G 7/053* (2013.01); *F16L 3/1058* (2013.01); *F16L 3/1075* (2013.01); *F16L 3/222* (2013.01); *H02G 7/05* (2013.01); *G02B 6/4471* (2013.01)

(58) Field of Classification Search
  CPC ....... F16L 3/1075; F16L 3/1058; F16L 3/222; G02B 6/4471; G02G 7/05; G02G 7/053
  See application file for complete search history.

(56) References Cited

U.S. PATENT DOCUMENTS

| | | | | |
|---|---|---|---|---|
| 3,155,354 A | * | 11/1964 | Lindsey | ................... H02G 7/05 174/144 |
| 5,435,507 A | * | 7/1995 | Murphy | ................... F16L 3/10 174/40 R |
| 6,135,398 A | | 10/2000 | Quesnel | |
| 6,892,990 B2 | | 5/2005 | Pisczak | |
| 9,534,707 B2 | * | 1/2017 | Sakmar | ............... G02B 6/4471 |
| 2003/0122040 A1 | * | 7/2003 | Pisczak | ................. H02G 7/053 248/74.1 |

* cited by examiner

Primary Examiner — Anita M King
(74) Attorney, Agent, or Firm — Dority & Manning, P.A.

(57) ABSTRACT

A cable support device includes a body having a first bracket and a cap having a first hinge. The cable support device further includes a transition piece disposed between the body and the cap. The transition piece includes an integrally formed body portion and oppositely-facing cap portion. The body portion has an inner surface defining a body portion groove extending longitudinally from a first end to an opposite end of the body portion. The body portion further includes a second bracket. The cap portion has an inner surface defining a cap portion groove extending longitudinally from a first end to an opposite end of the cap portion. The cap portion further includes a second hinge.

20 Claims, 9 Drawing Sheets

TANDEM TRUNNION CLAMP

FIELD OF THE INVENTION

The present disclosure relates generally to support devices, also known as trunnion clamps, for stringing and supporting cables to poles, towers and other suitable support structures.

BACKGROUND OF THE INVENTION

Fiber optic cables are widely used for data transmission and require careful handling because of the fragile optical fibers being carried and protected by such cables. These cables are suspended from support structures via support devices and are subject to various dynamic and static stresses that must be controlled. Static stress is caused primarily because the cable is suspended only at longitudinally distanced points while dynamic stress is caused mainly by oscillation of the cable. This oscillation, generally resulting from wind, ice and varying temperatures affecting tension of the cable can damage the cable and associated fibers. Many support devices do not adequately control the effect that stresses have on the cable. For instance, the support device must permit a limited amount of oscillation but not so much as to cause damage to the fibers.

Nor do many of the support devices facilitate ease of stringing the cable. Along with supporting the cable, the device must accommodate the required sag of the cable between support structures. Also, the device must allow cable to slip before fiber damage occurs, yet maintain the cable to required installation tensions. Typically the devices require disassembly, have many parts and do not reassemble easily. As the cables are strung and repaired in the field where non-optimal conditions are almost a certainty, a device that allows for quick and easy stringing of the cable is desired.

Further, many of the support devices do not easily attach to the designated support structure.

Still further, many support devices are only designed to accommodate a single cable. Support devices which accommodate multiple cables can require the use of a considerable number of parts, and can be complicated and expensive to implement.

Accordingly, improved cable support devices would be desired. In particular, cable support devices which address various of the above-described issues would be advantageous. Specifically, cable support devices which accommodate multiple cables while also addressing various other of the above-described issues would be advantageous.

BRIEF DESCRIPTION OF THE INVENTION

Aspects and advantages of the invention will be set forth in part in the following description, or may be obvious from the description, or may be learned through practice of the invention.

In accordance with embodiments of the present disclosure, a cable support device is provided. The cable support device includes a body having an inner surface defining a body groove extending longitudinally from a first end to an opposite end of the body. The body further includes a first bracket. The cable support device further includes a cap having an inner surface defining a cap groove extending longitudinally from a first end to an opposite end of the cap. The cap further includes a first hinge. The cable support device further includes a transition piece disposed between the body and the cap. The transition piece includes an integrally formed body portion and oppositely-facing cap portion. The body portion has an inner surface defining a body portion groove extending longitudinally from a first end to an opposite end of the body portion. The body portion further includes a second bracket. The cap portion has an inner surface defining a cap portion groove extending longitudinally from a first end to an opposite end of the cap portion. The cap portion further includes a second hinge.

In some embodiments, a cable support device may include a body bushing having an outer surface and an inner surface, the outer surface seatable within the body groove; a cap bushing having an outer surface and an inner surface, the outer surface seatable within the cap groove; a body portion bushing having an outer surface and an inner surface, the outer surface seatable within the body portion groove; and a cap portion bushing having an outer surface and an inner surface, the outer surface seatable within the cap portion groove.

In some embodiments, the first bracket and second hinge form a first hinge mechanism for connecting and aligning the body and the cap portion such that the body groove and the cap portion groove define a first channel. Further, in some embodiments, the second bracket and first hinge form a second hinge mechanism for connecting and aligning the body portion and the cap such that the body portion groove and the cap groove define a second channel.

In some embodiments, the first bracket may define a first bracket slot and first opposing groove slots, and the second bracket may define a second bracket slot and second opposing groove slots. Further, in some embodiments, the first hinge may include first opposing hinge wings, and the second hinge may include second opposing hinge wings. The first bracket slot may receive the second opposing hinge wings and the second bracket slot may receive the first opposing hinge wings.

In some embodiments, the second opposing hinge wings are received into the first opposing groove slots to form a first hinge mechanism and the first opposing hinge wings are received into the second opposing groove slots to form a second hinge mechanism.

In some embodiments, the cap portion is rotated to engage the second opposing hinge wings into the first opposing groove slots and the cap is rotated to engage the first opposing hinge wings into the second opposing groove slots. In other embodiments, no rotation of the cap portion or cap is necessary.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
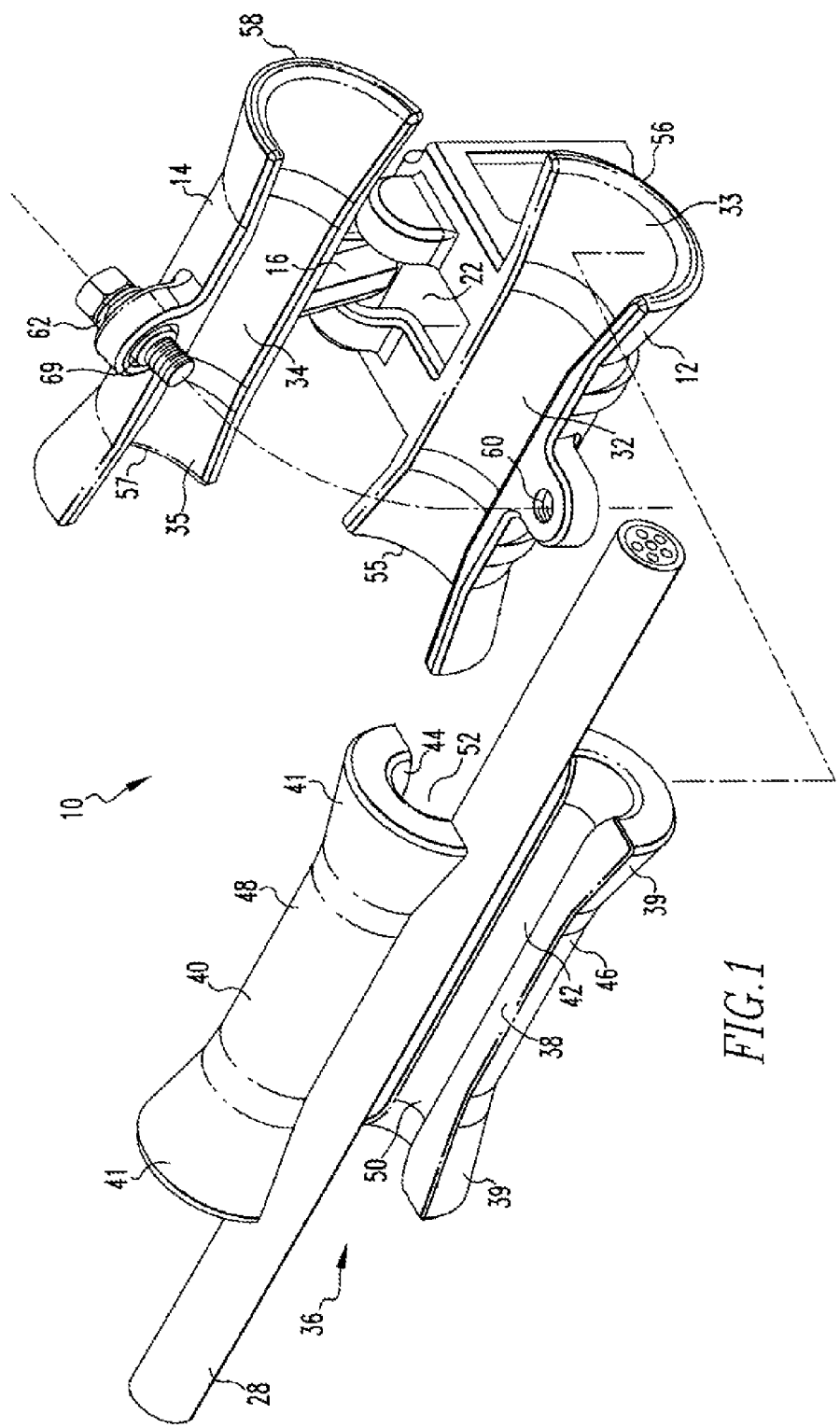
FIG. 1 is an exploded perspective view of a cable support device receiving a cable in accordance with embodiments of the present disclosure.
Figure 2:
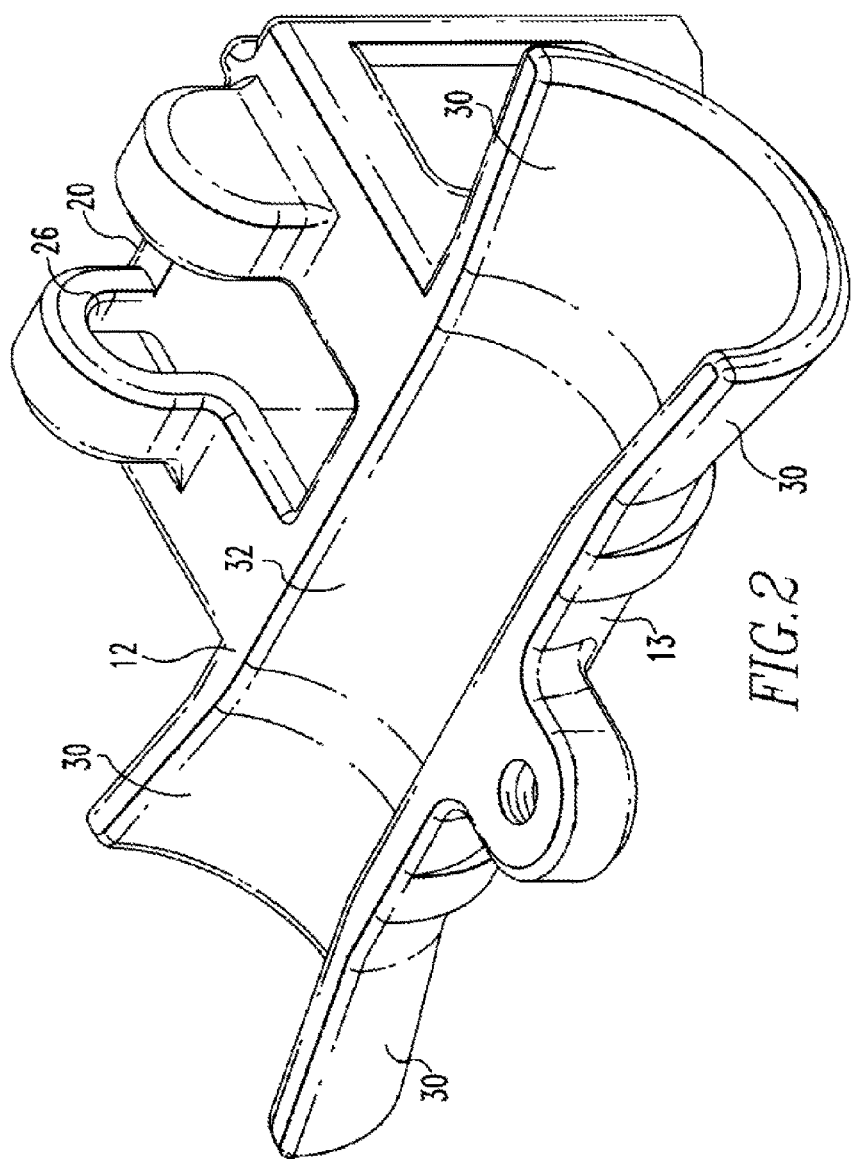
FIG. 2 is a perspective view of the body of a support device without a body bushing in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Embodiments of a cable support device 10, also known as a trunnion clamp, are illustrated in FIGS. 1-5. The cable support device 10 includes a body 12 and a corresponding cap 14. Body 12 and cap 14 mate via a hinge mechanism 16 that is preferably die cast or sand cast as a portion of both body 12 and cap 14. Hinge mechanism 16 may, for example, include hinge 18 and bracket 20. Hinge 18 may be a component of cap 14, and in exemplary embodiments is integrally formed as part of cap 14 such that cap 14 is a singular, unitary component. Hinge 18 may mate with bracket 20. Bracket 20 may be a component of body 12, and in exemplary embodiments is integrally formed as part of body 12 such that the body 12 is a singular, unitary component.

As shown, hinge 18 may include opposing wings 24 extending generally transversely from a central hinge shaft 25. Bracket 20 may include a slot 22 which is defined in the body 12, and may further include opposing groove slots 26 extending generally transversely from the slot 22. To mate cap 14 and body 12, cap 14 may in some embodiments be rotated approximately 90 degrees from its upright position, and hinge 18 may be inserted into slot 22 of bracket 20. Cap 14 may then be rotated back to its upright position so that wings 24 of hinge 18 slide into groove slots 26 of bracket 20. In other embodiments, slot 22 may be wide enough to accommodate the wings 24, such that no rotation is necessary. In these embodiments, hinge 18 may simply be inserted into slot 22 and translated such that wings 24 slide into groove slots 26, with no rotation necessary. By aligning wings 24 and groove slots 26, body 12 and cap 14 are properly mated. Once mated, body 12 and cap 14 do not need to be completely separated during installation, or when receiving cable 28. Device 10, however, can be disassembled without tools and parts of the device can be replaced if needed.

Body 12 and cap 14 may define body groove 32 and cap groove 34, respectively. Body groove 32 extends longitudinally from first end 55 to the opposite end 56 of arcuate portion 13 of body 12 while cap groove 34 extends longitudinally from first end 57 to opposite end 58 of arcuate portion 15 of cap 14. Body groove 32 and cap groove 34 are provided by the u-shaped inner surfaces 33 and 35 of arcuate portion 13 of body 12 and arcuate portion 15 of cap 14 respectively. When body 12 and cap 14 are aligned and mated, body groove 32 and cap groove 34 create channel 36. Body groove 32 and cap groove 34 may further receive body bushing 38 and cap bushing 40, respectively, for encompassing, gripping and cushioning cable 28.

Body bushing 38 and cap bushing 40 have inner surfaces 42 and 44 and outer surfaces 46 and 48 respectively. The outer surfaces 46 and 48 of body bushing 38 and cap bushing 40 are arcuate and sized to snugly mate with u-shaped inner surfaces 33 and 35 of body 12 and cap 14. Inner surfaces 42 and 44 of body bushing 38 and cap bushing 40 are each provided with central grooves 50 and 52, respectively. When bushings 38 and 40 are placed in grooves 32 and 34 and body 12 and cap 14 are mated, body bushing groove 50 and cap bushing groove 52 form bushing channel 54 which directly contacts and holds cable 28. Simply by varying the size of grooves 50 and 52, cables having a range of diameters can be accommodated by device 10. Thus, it is not necessary to manipulate the device to fit different diameter cables at the time of installation.

Bushings 38 and 40 are, in exemplary embodiments, made of an elastomer material, preferably a compliant material such as ethylene propylene diene monomer ("EPDM") rubber made for outdoor applications. The elastomer material provides excellent slip strength and is able to hold the cable to acceptable slip loads of at least 400 pounds without causing attenuation to the optical fibers. Further, in exemplary embodiments, the elastomer material may have a dielectric constant that is close to the dielectric constant of an all-dielectric self-supporting ("ADSS") cable jacket which is of the type of cable generally strung using a trunnion as described herein. Closely matching these dielectric constants helps to minimize leakage current resulting from electric charge build up, such as that caused by the cable's close proximity to power cables. Such an electric discharge will eventually degrade the cable at the bushing interface.

Body 12 and cap 14 may, in exemplary embodiments, have radially and axially extending flared edges 30 and 31, respectively. In these embodiments, the associated bushings may also have flared edges 39 and 41, respectively. These flared edges limit relative axial movement between the bushings and the body and cap. The bushings are additionally held in place by the surface friction created because of the dissimilar materials used for the bushing and the body and cap. That is, in exemplary embodiments, the body and cap have aluminum casting surfaces that are gripped by the elastomer bushings.

Figure 3:
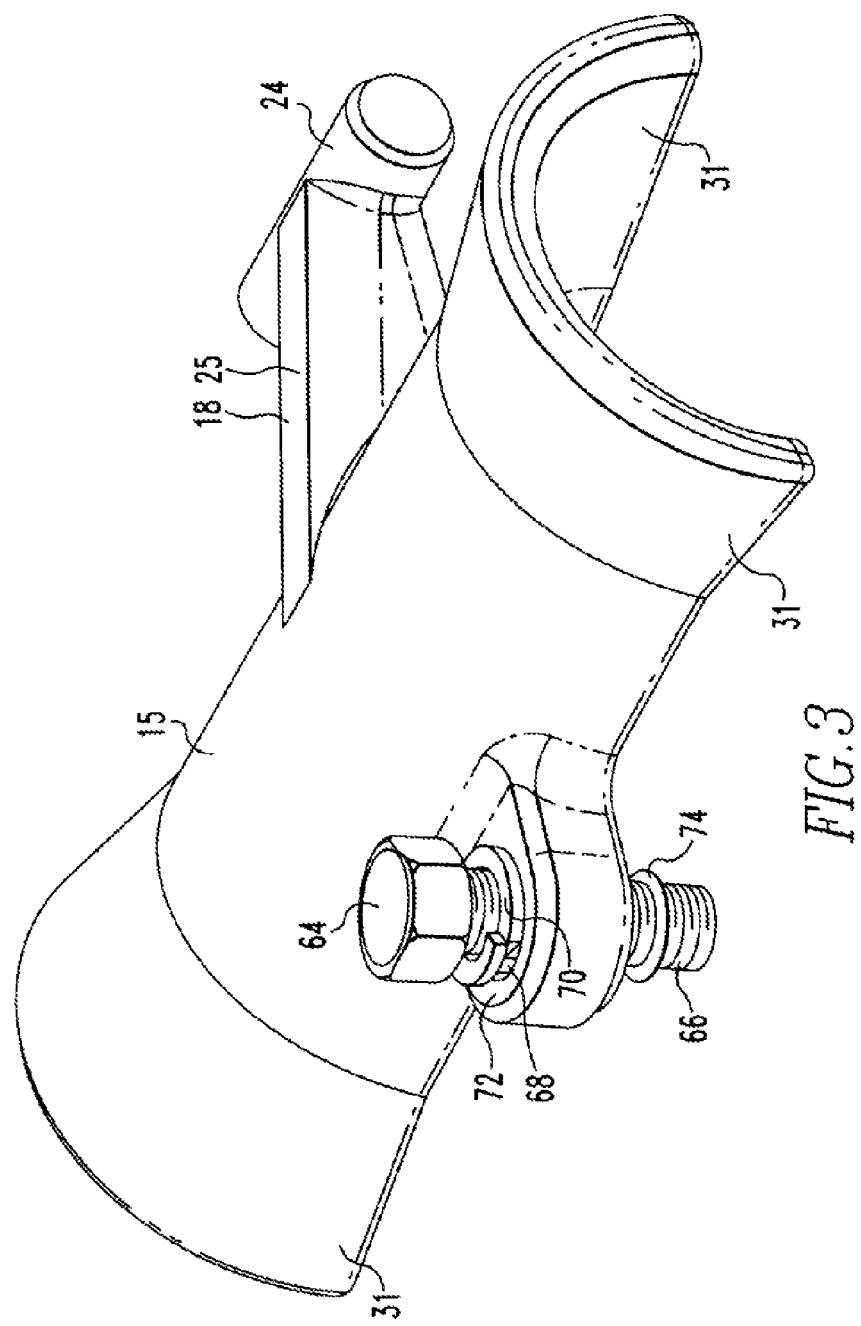
FIG. 3 is a perspective view of the cap of a support device without a cap bushing in accordance with embodiments of the present disclosure.
Figure 4:
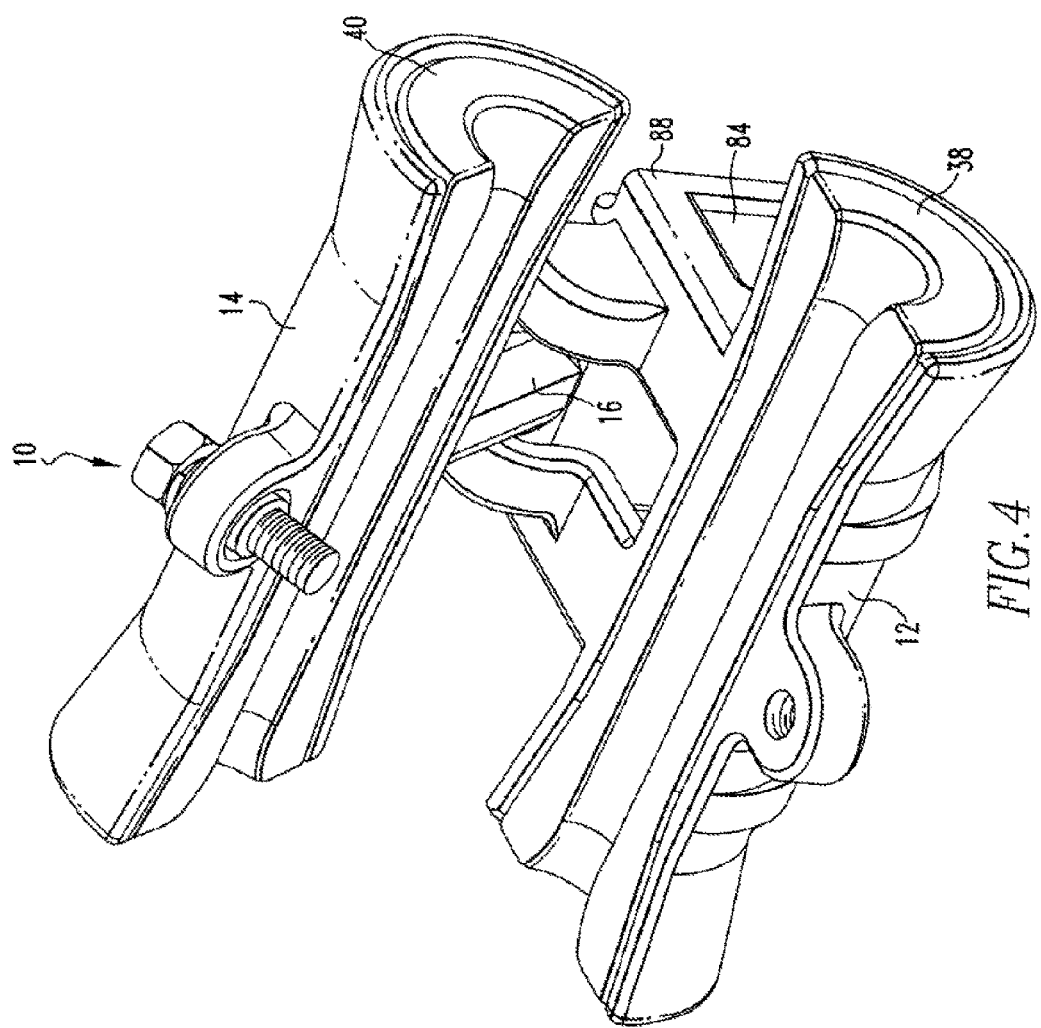
FIG. 4 is a perspective view of an assembled support device, including the bushings, in its open position in accordance with embodiments of the present disclosure.

Body 12 may include an aperture 60, which in exemplary embodiments in threaded, that is used in conjunction with a fastener such as a bolt 62 to secure cap 14 and body 12 after cable 28 has been placed in bushing channel 54. Cap 14 may include an opening 68, which in exemplary embodiments is non-threaded, that aligns with aperture 60 when cap 14 and body 12 are mated. Prior to installation, as shown by FIGS. 1, 3 and 4, a loosely fitted lock washer 70 may be put onto bolt stem 66. Bolt 62 may be inserted into opening 68 of cap 14, which may cause washer 70 to contact bolt head 64 and the outer surface 72 of opening 68. Also prior to installation, a tightly fitted o-ring 74 may be placed on bolt stem 66. Accordingly, bolt 62 and lock washer 70 may be used in combination to tighten the device about the cable. O-ring 74 may prevent bolt 62 and lock washer 70 from falling out of opening 68 when cap 14 and body 12 are opened during stringing of the cable and final assembly. O-ring 74 is pushed up into the lower enlarged end 69 of opening 68 when bolt 62 is tightened. Devices in accordance with the present disclosure advantageously minimize loose assembly parts in the field. Thus, there are not loose parts, bolts, nuts or the like that have to be carefully retained when the cable 28 is run through bushing channel 54.

Figure 5:
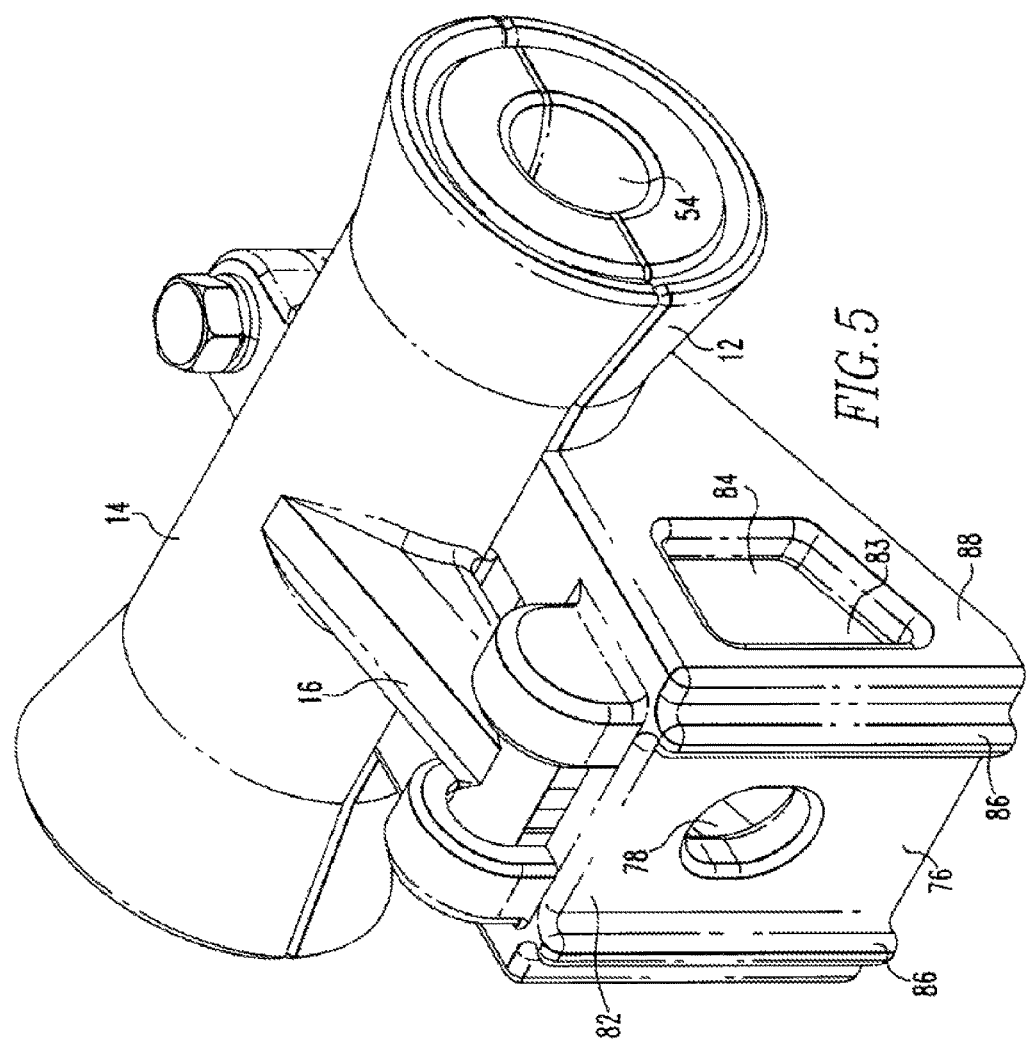
FIG. 5 is a perspective view of an assembled support device, including the bushings, in its closed position in accordance with embodiments of the present disclosure.
Figure 6A:
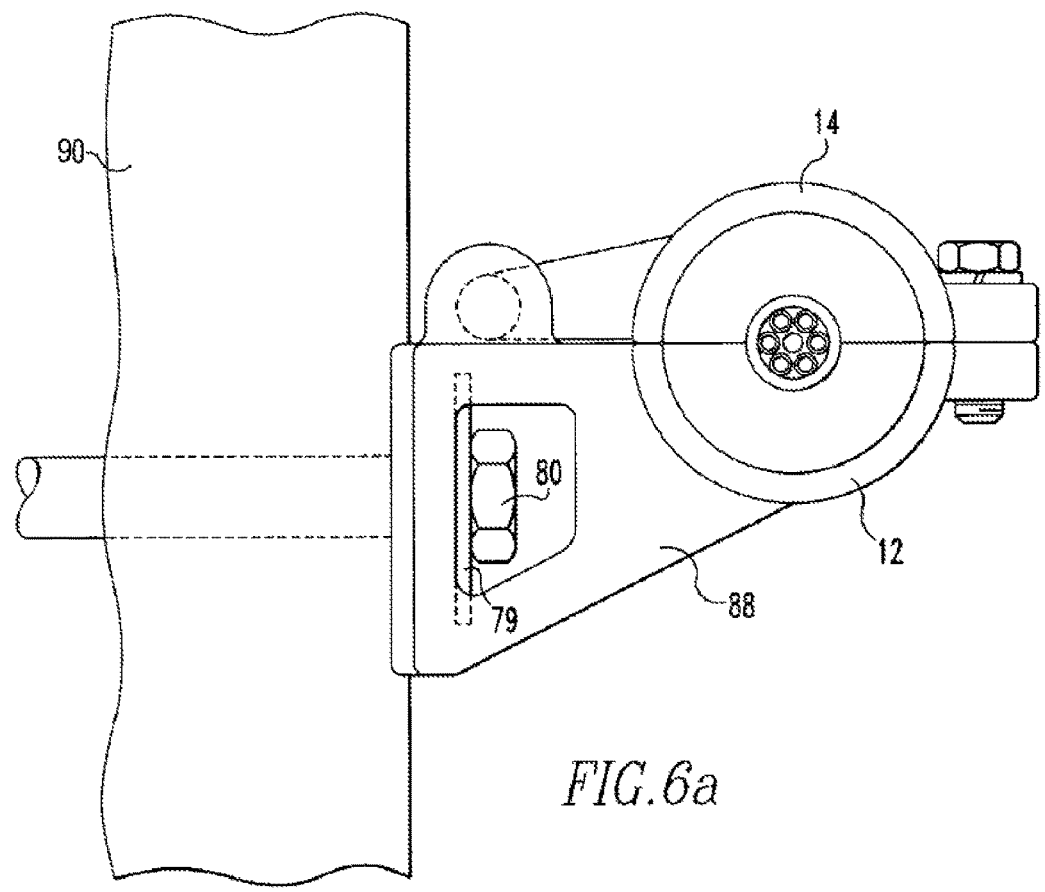
FIG. 6a is a side view of a support device affixed to a support structure via a bolt in accordance with embodiments of the present disclosure.
Figure 6B:
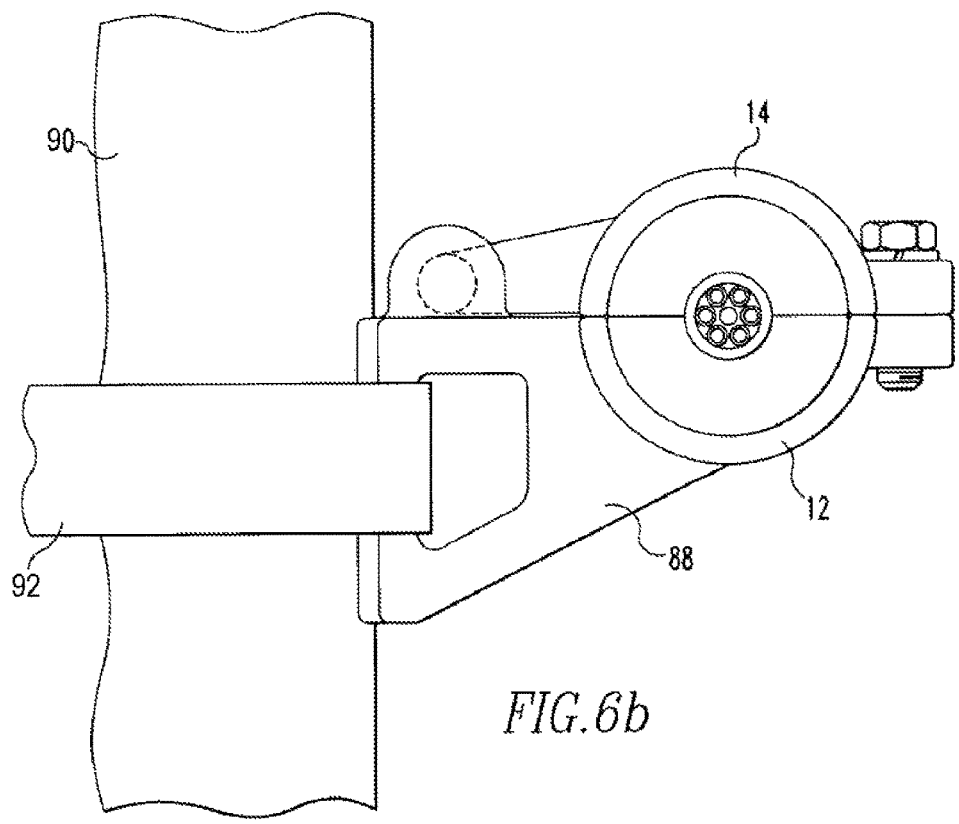
FIG. 6b is a side view of a support device banded to a support structure in accordance with embodiments of the present disclosure.
Figure 7:
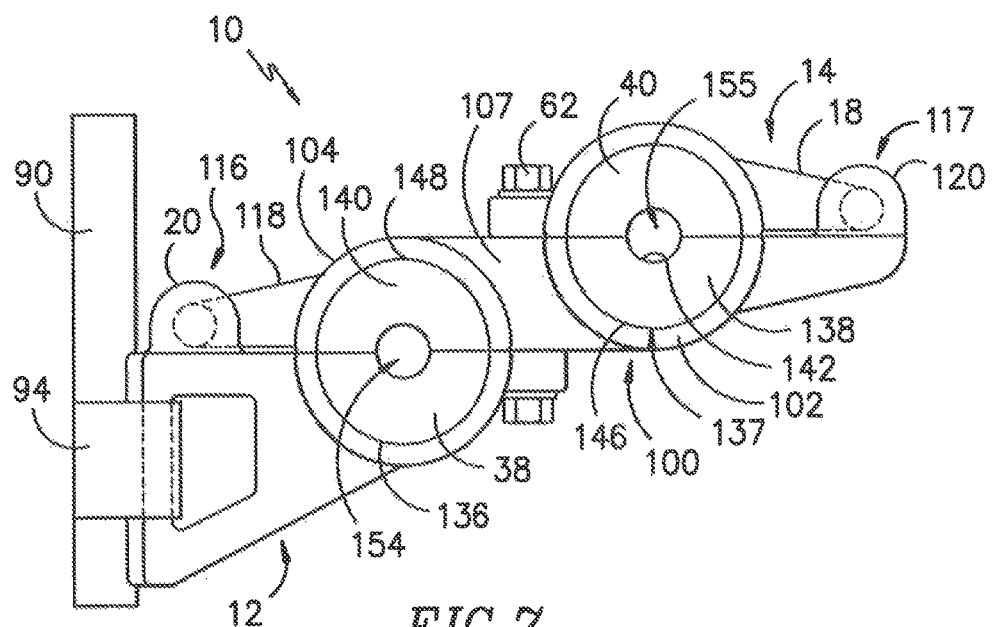
FIG. 7 is a side view of a support device, including a transition piece, banded to a support structure in accordance with embodiments of the present disclosure.
Figure 8:
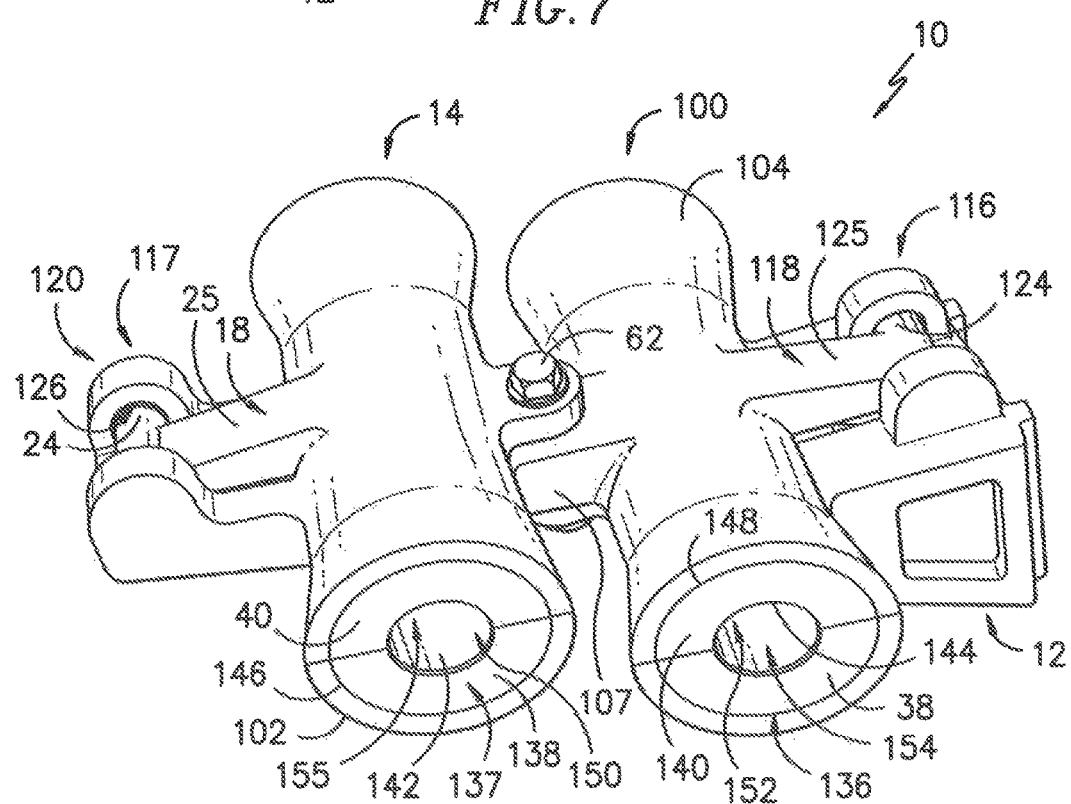
FIG. 8 is a perspective view of a support device, including a transition piece, in accordance with embodiments of the present disclosure.
Figures 9, 10:
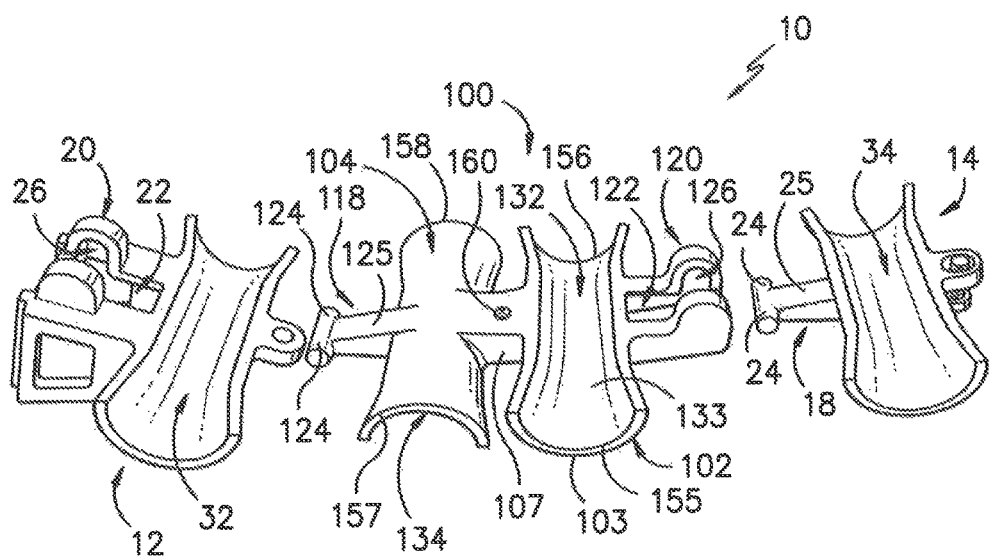
FIG. 9 is a perspective disassembled view of a support device, including a transition piece, in accordance with embodiments of the present disclosure.
FIG. 10 is a perspective view of a transition piece of a support device in accordance with embodiments of the present disclosure.

Body 12 may include a securing structure for securing the device 10 to a support structure. For example, securing structure may include mounting surface 76 that has aperture 78 for receiving a mounting bolt 80, as shown in FIGS. 5, 6a and 6b. To install the device 10, the device 10 is properly aligned with support structure 90 and mounting bolt 80 is simply tightened and imbedded into support structure 90 to affix device 10 to support structure 90 as shown in FIG. 6a. A washer, such as a square washer 79, may be used to distribute the force of bolt 80 over the mounting surface. Square washer 79 may also prevent wings 24 of hinge 18 from sliding out of groove slots 26 of bracket 20. That is, when bolt 62 is loosened and cap 14 and body 12 are opened, for example, to receive the bushings during final assembly, cap 14 is held in place by washer 79. Note that the device of this invention is installed without having to thread the device to a bolt or stud protruding from a support structure or rotating the device, which can be quite cumbersome.

It is, however, also possible to secure the device to a support structure using a double arming bolt as is commonly used. When using an arming bolt with devices in accordance with the present disclosure, however, it is not necessary to be overly concerned with how far the bolt extends from the support structure as is often the case with existing designs. The bolt only has to extend through the somewhat thin wall of the body of mounting surface 76 on which aperture 78 is located.

Along with securing the device 10 to a support structure via a fastener such as a bolt, the device 10 can also be secured using banding without the use of a separate adapter as shown in FIG. 6b. Body 12 of device 10 may have side walls 88 extending between mounting surface 76 and arcuate portion 13 of body 12. Banding windows 84 are formed on side walls 88 to receive, for example, a metal banding strip 92 that can be wrapped about the support structure to secure the device, as shown in FIG. 6b. Users may prefer this type of securing method when a concrete or steel support structure is used.

Body 12 of the device 10 may also include anti-rotational legs 86 on outer surface 82 of mounting surface 76. The legs 86 may grip and match the contour of support structure 90. Legs 86 prevent rotation of the device 10 about the support structure, regardless of the material from which the structure is made, including wood, metal or concrete.

Inner surface 83 of mounting surface 76 of body 12 along with side walls 88 are designed to facilitate distribution of the load of cable 28 on the device. Side walls 88 extend partially around arcuate portion 13 of body 12 to help minimize stress and better distribute the load of the cable. Thus, forces are distributed evenly through the device and no areas of high stress are generated by stringing the cable, during final assembly or use of the device.

The body 12 and cap 14 are preferably made of aluminum, such as via a die casting process or sand casting process that provides sufficiently smooth surfaces without further machining or polishing to use the device as a stringing block. The smooth surfaces prevent damage or abrasion to the cable when the device is used without bushings to string cable prior to final assembly. Many current devices require that special polishing processes be used after machining to achieve acceptable surface finishes for the areas of the device that directly contact the cable. Ball burnishing may be used rather than die casting or sand casting to create acceptable cable contacting surfaces.

Devices 10 of the present disclosure are designed to handle cable loading even under extreme weather conditions. The device can easily withstand maximum vertical forces of about 1600 pounds. The device is also able to bear cable loading resulting from wind velocities of 110 mph in a maximum span of 600 feet and can withstand longitudinal unbalanced ice loading. The device also permits greater flexibility than existing support devices to alter the line angle of the cable up to about 22 degrees. Thus, this device is an easily installable, reduced cost, superior functioning cable stringing and support device.

Referring now to FIGS. 7 through 10, additional embodiments of cable support devices 10 in accordance with the present disclosure are provided. As illustrated, such cable support devices 10 may include a body 12 and a cap 14 (along with associated bushings 38, 40. Further such cable support devices 10 may advantageously include a transition piece 100. The transition piece 100 may be positionable generally between the body 12 and the cap 14. When disposed between the body 12 and the cap 14, the transition piece 100 may interface with both the body 12 and the cap 14 to provide support locations for two (or more) cables 28, which advantageous may be of the same or different diameters. Accordingly, such devices 10 may advantageously provide expanded capacity while still providing the various advantages discussed above. Additionally, existing cable support devices 10 which include only the body 12 and cap 14 may advantageously be retrofitted to expand their capacity. Notably, all that is required to retrofit an existing support device 10 in accordance with the present disclosure is a transition piece 100 and an additional set of bushings. Accordingly, the number of components required for such expansion is advantageously reduced and simplified.

The transition piece 100 may include a body portion 102 and a cap portion 104. The cap portion 104 may have an oppositely-facing orientation from the body portion 102, as shown. In other words, the body portion 102 may face generally upwards (when appropriately mounted, as conventionally understood) and the cap portion 104 may face generally downwards (when appropriately mounted, as conventionally understood). A bridge 107 may extend between and connect the body portion 102 and cap portion 104. Further, the body portion 102 and cap portion 104 may in exemplary embodiments be integrally formed, such as via die casting or sand casting, such that the transition piece 100 is a singular, unitary component.

Body portion 102 may include a second bracket 120, and cap portion 104 may include a second hinge 118. The first bracket 20 of the body 12 and the second hinge 118 may be mateable to form a first hinge mechanism 116. The second bracket 120 may be mateable with the first hinge 18 of the cap 14 to form a second hinge mechanism 117. The hinge mechanisms 116, 117 are preferably die cast or sand cast as portions of body 12, cap 14 and transition piece 100 (i.e. the body portion 102 and cap portion 104 thereof).

First hinge mechanism 116 may, for example, include first bracket 20 and second hinge 118. Hinge 118 may be a component of cap portion 104, and in exemplary embodiments is integrally formed as part of cap portion 104. Hinge 118 may mate with bracket 20.

As shown, hinge 118 may include opposing wings 124 extending generally transversely from a central hinge shaft 125. To mate cap portion 104 and body 12, cap portion 104 may in some embodiments be rotated approximately 90 degrees from its upright position, and hinge 118 may be inserted into slot 22 of bracket 20. Cap portion 104 may then be rotated back to its upright position so that wings 124 of hinge 118 slide into groove slots 26 of bracket 20. In other embodiments, slot 22 may be wide enough to accommodate the wings 124, such that no rotation is necessary. In these embodiments, hinge 118 may simply be inserted into slot 22 and translated such that wings 124 slide into groove slots 26, with no rotation necessary. By aligning wings 124 and groove slots 26, body 12 and cap portion 104 are properly mated.

Second hinge mechanism 117 may, for example, include second bracket 120 and first hinge 18. Bracket 120 may be a component of body portion 102, and in exemplary embodiments is integrally formed as part of body portion 102 such that the body portion 102 is a singular, unitary component.

As shown, bracket 120 may include a slot 122 which is defined in the body 102, and may further include opposing groove slots 126 extending generally transversely from the slot 122. To mate cap 14 and body portion 102, cap 14 may in some embodiments be rotated approximately 90 degrees from its upright position, and hinge 18 may be inserted into slot 122 of bracket 120. Cap 14 may then be rotated back to its upright position so that wings 24 of hinge 18 slide into groove slots 126 of bracket 120. In other embodiments, slot 122 may be wide enough to accommodate the wings 24, such that no rotation is necessary. In these embodiments, hinge 18 may simply be inserted into slot 122 and translated such that wings 24 slide into groove slots 126, with no rotation necessary. By aligning wings 24 and groove slots 126, body portion 102 and cap 14 are properly mated.

Body portion 102 and cap portion 104 may define body portion groove 132 and cap portion groove 134, respectively. Body portion groove 132 extends longitudinally from first end 155 to the opposite end 156 of arcuate portion 103 of body portion 102 while cap portion groove 134 extends longitudinally from first end 157 to opposite end 158 of arcuate portion 105 of cap 104. Body portion groove 132 and cap portion groove 134 are provided by the u-shaped inner surfaces 133 and 135 of arcuate portion 103 of body portion 102 and arcuate portion 105 of cap portion 104 respectively.

When body 12 and cap portion 104 are aligned and mated, body groove 32 and cap portion groove 134 create first channel 136. Body groove 32 and cap portion groove 134 may further receive body bushing 38 and cap portion bushing 140, respectively, for encompassing, gripping and cushioning a cable 28. When body portion 102 and cap 14 are aligned and mated, body portion groove 132 and cap groove 34 create second channel 137. Body portion groove 132 and cap groove 34 may further receive body portion bushing 138 and cap bushing 40, respectively, for encompassing, gripping and cushioning a cable 28.

Body portion bushing 138 and cap portion bushing 140 have inner surfaces 142 and 144 and outer surfaces 146 and 148 respectively. The outer surfaces 146 and 148 of body portion bushing 138 and cap portion bushing 140 are arcuate and sized to snugly mate with u-shaped inner surfaces 133 and 135 of body portion 102 and cap portion 104. Inner surfaces 142 and 144 of body portion bushing 138 and cap portion bushing 140 are each provided with central grooves 150 and 152, respectively. When bushings 38 (or 138) and 140 (or 40) are placed in grooves 32 and 134 and body 12 and cap portion 104 are mated, body bushing groove 50 (or 150) and cap portion bushing groove 152 (or 52) form first bushing channel 154 which directly contacts and holds a cable 28. When bushings 138 (or 38) and 40 (or 140) are placed in grooves 132 and 34 and body portion 102 and cap 14 are mated, body portion bushing groove 150 (or 50) and cap bushing groove 52 (or 152) form second bushing channel 155 which directly contacts and holds a cable 28. Simply by varying the size of grooves 150 and 152, along with grooves 50 and 52 as discussed above, cables having a range of diameters can be accommodated by device 10. Thus, it is not necessary to manipulate the device to fit different diameter cables at the time of installation. This is particularly advantageous when the device 10 is utilized with multiple cables 28 having different diameters.

Bushings 138 and 140 are, in exemplary embodiments, made of an elastomer material, preferably a compliant material such as ethylene propylene diene monomer ("EPDM") rubber made for outdoor applications. The elastomer material provides excellent slip strength and is able to hold the cable to acceptable slip loads of at least 400 pounds without causing attenuation to the optical fibers. Further, in exemplary embodiments, the elastomer material may have a dielectric constant that is close to the dielectric constant of an all-dielectric self-supporting ("ADSS") cable jacket which is of the type of cable generally strung using a trunnion as described herein. Closely matching these dielectric constants helps to minimize leakage current resulting from electric charge build up, such as that caused by the cable's close proximity to power cables. Such an electric discharge will eventually degrade the cable at the bushing interface.

Body portion 102 and cap portion 104 may, in exemplary embodiments, have radially and axially extending flared edges 130 and 131, respectively. In these embodiments, the associated bushings may also have flared edges. These flared edges limit relative axial movement between the bushings and the body portion and cap portion. The bushings are additionally held in place by the surface friction created because of the dissimilar materials used for the bushing and the body portion and cap portion. That is, in exemplary embodiments, the body portion and cap portion have aluminum casting surfaces that are gripped by the elastomer bushings.

Bridge 107 may include an aperture 160, which may be threaded or non-threaded, that is used in conjunction with a fastener such as bolt 62 to secure cap 14, body 12, and transition piece 100 after cables 28 has been placed in bushing channels 154, 155. The aperture 160 may align with aperture 60 and opening 68, and the fastener may be inserted therethrough. Various additional fastening components, such as lock washer 70, o-ring 74, etc., may additionally be utilized, as discussed above. The fastening components may be utilized in a manner as described above, with the additional step of the bolt 62 extending through the aperture 160.

The body portion 102, cap portion 104, and transition piece 100 generally are preferably made of aluminum, such as via a die casting process or sand casting process that provides sufficiently smooth surfaces without further machining or polishing to use the device as a stringing block. The smooth surfaces prevent damage or abrasion to the cables when the device is used without bushings to string cables prior to final assembly. Many current devices require that special polishing processes be used after machining to achieve acceptable surface finishes for the areas of the device that directly contact the cable. Ball burnishing may be used rather than die casting or sand casting to create acceptable cable contacting surfaces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable support device, comprising:
   a body having an inner surface defining a body groove extending longitudinally from a first end to an opposite end of the body, the body further comprising a first bracket;
   a cap having an inner surface defining a cap groove extending longitudinally from a first end to an opposite end of the cap, the cap further comprising a first hinge; and
   a transition piece disposed between the body and the cap, the transition piece comprising an integrally formed body portion and oppositely-facing cap portion, the body portion having an inner surface defining a body portion groove extending longitudinally from a first end to an opposite end of the body portion, the body portion further comprising a second bracket, the cap portion having an inner surface defining a cap portion groove extending longitudinally from a first end to an opposite end of the cap portion, the cap portion further comprising a second hinge,
   wherein the first bracket and second hinge form a first hinge mechanism for connecting and aligning the body and the cap portion such that the body groove and the cap portion groove define a first channel, and wherein the second bracket and first hinge form a second hinge mechanism for connecting and aligning the body portion and the cap such that the body portion groove and the cap groove define a second channel.

2. The cable support device of claim 1, further comprising:
   a body bushing having an outer surface and an inner surface, the outer surface seatable within the body groove;
   a cap bushing having an outer surface and an inner surface, the outer surface seatable within the cap groove;
   a body portion bushing having an outer surface and an inner surface, the outer surface seatable within the body portion groove; and
   a cap portion bushing having an outer surface and an inner surface, the outer surface seatable within the cap portion groove.

3. The cable support device of claim 2, wherein the body bushing, cap bushing, body portion bushing and cap portion bushing are each formed from an elastomer.

4. The cable support device of claim 3, wherein the elastomer is ethylene propylene diene monomer rubber.

5. The cable support device of claim 1, wherein the first bracket defines a first bracket slot and first opposing groove slots, the second bracket defines a second bracket slot and second opposing groove slots, the first hinge comprises first opposing hinge wings, and the second hinge comprises second opposing hinge wings, and wherein the first bracket slot receives the second opposing hinge wings and the second bracket slot receives the first opposing hinge wings.

6. The cable support device of claim 5, wherein the second opposing hinge wings are further received into the first opposing groove slots to form the first hinge mechanism and the first opposing hinge wings are further received into the second opposing groove slots to form the second hinge mechanism.

7. The cable support device of claim 6, wherein the cap portion is rotated to engage the second opposing hinge wings into the first opposing groove slots and the cap is rotated to engage the first opposing hinge wings into the second opposing groove slots.

8. The cable support device of claim 1, wherein the body, the cap, the body portion and the cap portion each include flared edges.

9. The cable support device of claim 1, wherein the body further comprises a securing structure, the securing structure comprising a mounting surface defining an aperture.

10. The cable support device of claim 9, wherein the mounting surface comprises a plurality of legs that prevent rotation of the device when mounted.

11. The cable support device of claim 9, wherein the securing structure includes side walls and windows.

12. The cable support device of claim 1, wherein the body, the cap and the transition piece are formed by die casting or sand casting.

13. The cable support device of claim 1, wherein the body, the cap and the transition piece are formed from aluminum.

14. A cable support device, comprising:
    a body having an inner surface defining a body groove extending longitudinally from a first end to an opposite end of the body, the body further comprising a first bracket which defines a first bracket slot and first opposing groove slots;
    a cap having an inner surface defining a cap groove extending longitudinally from a first end to an opposite end of the cap, the cap further comprising a first hinge which comprises first opposing hinge wings; and
    a transition piece disposed between the body and the cap, the transition piece comprising an integrally formed body portion and oppositely-facing cap portion, the body portion having an inner surface defining a body portion groove extending longitudinally from a first end to an opposite end of the body portion, the body portion further comprising a second bracket which defines a second bracket slot and second opposing groove slots, the cap portion having an inner surface defining a cap portion groove extending longitudinally from a first end to an opposite end of the cap portion, the cap portion further comprising a second hinge which comprises second opposing hinge wings, wherein the second opposing hinge wings are received into the first opposing groove slots to form a first hinge mechanism and the first opposing hinge wings are received into the second opposing groove slots to form a second hinge mechanism.

15. The cable support device of claim 14, further comprising:
   a body bushing having an outer surface and an inner surface, the outer surface seatable within the body groove;
   a cap bushing having an outer surface and an inner surface, the outer surface seatable within the cap groove;
   a body portion bushing having an outer surface and an inner surface, the outer surface seatable within the body portion groove; and
   a cap portion bushing having an outer surface and an inner surface, the outer surface seatable within the cap portion groove.

16. The cable support device of claim 14, wherein the body bushing, cap bushing, body portion bushing and cap portion bushing are each formed from an elastomer.

17. The cable support device of claim 14, wherein the cap portion is rotated to engage the second opposing hinge wings into the first opposing groove slots and the cap is rotated to engage the first opposing hinge wings into the second opposing groove slots.

18. The cable support device of claim 14, wherein the body, the cap, the body portion and the cap portion each include flared edges.

19. The cable support device of claim 14, wherein the body further comprises a securing structure, the securing structure comprising a mounting surface defining an aperture.

20. The cable support device of claim 14, wherein the body, the cap and the transition piece are formed from aluminum.

* * * * *